United States Patent
Hong et al.

(10) Patent No.: US 12,001,834 B2
(45) Date of Patent: Jun. 4, 2024

(54) FIRMWARE PROVISION APPARATUS AND PROVISION METHOD THEREFOR

(71) Applicant: LG ELECTRONICS INC., Seoul (KR)

(72) Inventors: Sungmin Hong, Seoul (KR); Kyounghoi Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 179 days.

(21) Appl. No.: 17/784,609

(22) PCT Filed: Dec. 12, 2019

(86) PCT No.: PCT/KR2019/017579
§ 371 (c)(1),
(2) Date: Jun. 10, 2022

(87) PCT Pub. No.: WO2021/117939
PCT Pub. Date: Jun. 17, 2021

(65) Prior Publication Data
US 2023/0027848 A1 Jan. 26, 2023

(51) Int. Cl.
G06F 8/654 (2018.01)
G06F 8/61 (2018.01)
G06F 11/14 (2006.01)

(52) U.S. Cl.
CPC .............. *G06F 8/654* (2018.02); *G06F 8/63* (2013.01); *G06F 11/1433* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 9,164,757 B2 * | 10/2015 | Han | ........................ G06F 8/60 |
| 11,868,875 B1 * | 1/2024 | Diamant | ................. G11C 11/54 |
| 2011/0004723 A1 * | 1/2011 | Kheng-Chong | .... G06F 12/0246 711/E12.001 |

(Continued)

FOREIGN PATENT DOCUMENTS

KR 100744873 8/2007
KR 1020090079197 7/2009

OTHER PUBLICATIONS

Bogdan, "Delta Flashing of an ECU in the Automotive Industry", 2016, IEEE (Year: 2016).*

(Continued)

*Primary Examiner* — Hossain M Morshed
(74) *Attorney, Agent, or Firm* — LEE, HONG, DEGERMAN, KANG & WAIMEY

(57) ABSTRACT

The present invention relates to a firmware provision apparatus and a provision method therefor. The firmware provision apparatus according to the present invention comprises: a memory that stores firmware data of a specific device; and a processor that divides the firmware data into two or more logical blocks, and generates a firmware image including the logical blocks obtained from the division, wherein the logical blocks include data areas in which the corresponding divided firmware data is stored and buffer areas in which data about changed details of the corresponding divided firmware data is stored.

14 Claims, 8 Drawing Sheets

(56) References Cited

U.S. PATENT DOCUMENTS

| | | | |
|---|---|---|---|
| 2011/0119662 A1* | 5/2011 | Chen | G06F 8/65 |
| | | | 714/48 |
| 2011/0173604 A1* | 7/2011 | Nakamura | G06F 8/658 |
| | | | 717/173 |
| 2012/0151473 A1* | 6/2012 | Koch | G06F 9/45558 |
| | | | 718/1 |
| 2013/0047148 A1 | 2/2013 | Lui et al. | |
| 2013/0191821 A1 | 7/2013 | Armstrong et al. | |
| 2014/0223424 A1* | 8/2014 | Han | G06F 8/60 |
| | | | 717/173 |
| 2017/0322796 A1* | 11/2017 | Kim | G06F 9/4406 |
| 2018/0349129 A1* | 12/2018 | Ju | G06F 8/654 |
| 2019/0042278 A1 | 2/2019 | Pirvu et al. | |
| 2023/0027848 A1* | 1/2023 | Hong | G06F 8/654 |

OTHER PUBLICATIONS

PCT International Application No. PCT/KR2019/017579, Written Opinion and International Search Report dated Sep. 3, 2020, 15 pages.

\* cited by examiner

FIG. 3

|  | Before |
|---|---|
| Logical Block | ABCDEFGHIJ<br>KLMNOPQRST<br>UVWXYZAAAA |
|  | AAAAAAABB<br>DFGDFGDFCC<br>CCCCCCCCCC |
|  | CCCCCCCCCC<br>CDFGODFOFJ<br>DDDDDDDDDD |
|  | DEEEEEEEEE<br>EEEEEEFFFF |
|  |  |

(a)

| After |  |
|---|---|
| 31 — ABCDEFGHIJ<br>30 — KLMNOPQRST<br>UVWXZZZYZA | 3Byte Add |
| AAAAAAAAAA<br>ABBDFGDFGD<br>FCCCCCCCCC | Changed |
| CCCCCCCCCC<br>CCCCDFGODF<br>OFJDDDDDDD | Changed |
| DDDDEEEEEE<br>EEEEEEEEEF<br>FFF | Changed |
|  |  |

Before

Logical Block

ABCDEFGHIJ
KLMNOPQRST

UVWXYZAAAA
AAAAAAAABB — 410
— 420

DFGDFGDFCC
CCCCCCCCCC

CCCCCCCCCC
CDFGODFOFJ

DDDDDDDDD
DEEEEEEEEE
EEEEEEFFFF (a)

After

ABCDEFGHIJ
KLMNOPQRST — Unchanged

411 —
UVWX*ZZZ*YZA
410 — AAAAAAAAAA — 3Byte Add & Changed
421 — ABB

DFGDFGDFCC
CCCCCCCCCC — Unchanged

CCCCCCCCCC
CDFGODFOFJ — Unchanged

DDDDDDDDD
DEEEEEEEEE
EEEEEEFFFF — Unchanged (b)

FIG. 5

| Before | After |
|---|---|

Logical Block (a) Before:
- ABCDEFGHIJ KLMNOPQRST UVWXYZAAAA
- 51 — AAAAAAAABB DFGFUNC( )C  — 0 × 1004 : FUNC ( )
- 50 — CCCCCCCCCC
- CCCCCCCCCC CDFGODFOFJ DDDDDDDDDD
- DEEEEEEEEE ECALL( ).FFF  — CALL ( ); 0 × 1004

(b) After:
- ABCDEFGHIJ KLMNOPQRST UVWXZZZYZA — 52, 3Byte Add
- 51 — AAAAAAAAAA ABBDFGFUNC ( )CCCCCCCCC — 0 × 1007 : FUNC ( )
- CCCCCCCCCC CCCCDFGODF OFJDDDDDDD
- DDDDEEEEEE EEEECALL( ). FFF — CALL ( ); 0 × 1007

FIG. 6

FIRMWARE PROVISION APPARATUS AND PROVISION METHOD THEREFOR

CROSS-REFERENCE TO RELATED APPLICATIONS

This application is the National Stage filing under 35 U.S.C. 371 of International Application No. PCT/KR2019/017579, filed on Dec. 12, 2019, the contents of which are all incorporated by reference herein in their entireties.

TECHNICAL FIELD

The present disclosure relates to an apparatus for providing firmware to an external device and a provision method therefor.

BACKGROUND ART

Due to issues in terms of security and performance improvement, many Internet of Things (IoT) devices currently support firmware updates.

However, with the exception of some high-spec devices such as smartphones and tablets, many IoT devices such as washing machines, refrigerators, and dryers are configured with low specifications, and thus there are many restrictions on firmware update.

In detail, there is a problem in that the size of a package of firmware is limited due to lack of a storage space of IoT devices.

In addition, due to issues in terms of communication speed of UART for IoT devices, there is a problem in that an update time is greatly increased when the size of a package of firmware is increased, and accordingly, there is a problem in that it is inconvenient of not using a corresponding device for a long time during the update time.

In an existing firmware update method, firmware is updated using a differential method with a firmware image or is updated using a full-flash method, but when offset changes due to changes such as additional or removal to firmware data, there is a problem in that the change greatly affects the entire firmware image.

In addition, as functions of a microcontroller unit (MCU) are recently expanded in IoT devices and automobile fields, a need for firmware update of the MCU continues to increase.

In this regard, firmware update for the MCU is supported, but there is no method to back up an original firmware image due to lack of a storage space, and thus there is a problem in that recovery of firmware update failure is impossible.

DISCLOSURE

Technical Problem

An object of the present disclosure for satisfying the above-described needs or solving the above-described problems is to provide a firmware provision apparatus including a buffer for managing a change of firmware data in divided separate logical block when firmware data is divided into separate logical blocks and a method for providing the apparatus.

Another object of the present disclosure is to provide a firmware provision apparatus and a method for providing the apparatus for calling an original address through a function pointer even if a function pointer for calling an original address of a function is generated in a data area of a separate logical block and an address of the function is changed due to change in the firmware data.

Another object of the present disclosure is to provide a firmware provision apparatus and a method for providing the apparatus for requesting and backing up an original firmware image before firmware of the MCU is updated and for rolling back firmware of an MCU through a backed-up firmware image when firmware update of the MCU fails.

Technical Solution

According to an aspect, a firmware provision apparatus includes a memory configured to store firmware data of a specific device, and a processor configured to divide the firmware data into two or more logical blocks and to generate a firmware image including the divided logical blocks, wherein the logical blocks include a data area in which corresponding divided firmware data is stored, and a buffer area in which change data of the corresponding divided firmware data is stored.

According to another aspect, a method of providing firmware of a firmware provision apparatus includes storing firmware data of a specific device, dividing the firmware data into two or more logical blocks, and generating a firmware image including the divided logical blocks, wherein the logical blocks include a data area in which corresponding divided firmware data is stored, and a buffer area in which change data of the corresponding divided firmware data is stored.

Advantageous Effects

Effects of a mobile terminal and a control method thereof according to the present disclosure will be described below.

According to at least one embodiment of the present disclosure, even if a buffer is provided in a separate logical block and an offset change occurs, an entire firmware image may not be affected.

According to at least one embodiment of the present disclosure, updates in units of separate logical blocks may be provided to minimize restrictions due to memory resources.

According to at least one embodiment of the present disclosure, even if an address of a function referenced through a function pointer is changed in a data area of a logical block, an effect of calling the function may be provided.

According to at least one embodiment of the present disclosure, it may be possible to roll back firmware of the MCU through a backed-up firmware image when firmware update of the MCU fails by requesting and backing up an original firmware image before firmware of the MCU is updated.

DESCRIPTION OF DRAWINGS

FIG. 3 is a diagram for explaining a procedure in which delta is generated in all logical blocks when a change occurs in firmware data according to the present disclosure.

FIG. 4 is a diagram for explaining a procedure of minimizing delta using a logical block structure including a buffer area when a change occurs in firmware data according to an embodiment of the present disclosure.

FIG. 5 is a diagram for explaining a procedure in which a function is not capable of being called properly when a function address is changed due to a change of firmware data according to the present disclosure.

FIG. 6 is a diagram for explaining a procedure of calling a function with an original function using a function pointer when a change occurs in firmware data according to an embodiment of the present disclosure.

BEST MODE

Figure 1:
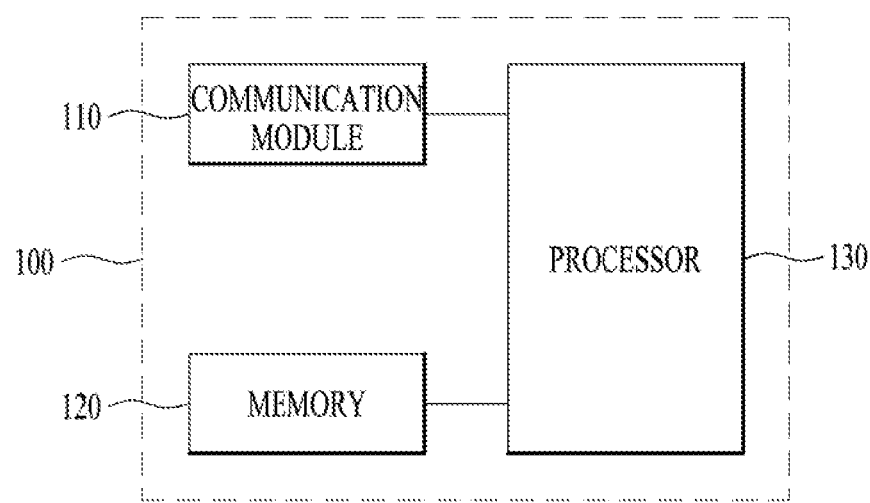
FIG. 1 is a block diagram for explaining a firmware provision apparatus according to an embodiment of the present disclosure.

Hereinafter, the present disclosure will be described in detail by explaining exemplary embodiments of the present disclosure with reference to the attached drawings. The same reference numerals in the drawings denote like elements, and a repeated explanation thereof will not be given. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purpose of clarity and for brevity. The features of the present disclosure will be more clearly understood from the accompanying drawings and should not be understood to be limited by the accompanying drawings, and it is to be appreciated that all changes, equivalents, and substitutes that do not depart from the spirit and technical scope of the present disclosure are encompassed in the present disclosure.

It will be understood that, although the terms "first", "second", "third" etc. may be used herein to describe various elements, these elements should not be limited by these terms. These terms are only used to distinguish one element from another element.

It will be understood that when an element is referred to as being "on", "connected to" or "coupled to" another element, it may be directly on, connected or coupled to the other element, or intervening elements may be present. In contrast, when an element is referred to as being "directly on," "directly connected to" or "directly coupled to" another element or layer, there are no intervening elements present.

Singular expressions in the present specification include the plural expressions unless clearly specified otherwise in context.

It will be further understood that the terms "comprises" or "comprising" when used in this specification specify the presence of stated features, integers, steps, operations, elements, or components, but do not preclude the presence or addition of one or more other features, integers, steps, operations, elements, components, or groups thereof.

A firmware provision apparatus described in the present disclosure may be included in a portable phone, a smart phone, a laptop computer, a digital broadcasting terminal, personal digital assistants (PDA), a portable multimedia player (PMP), a navigation device, a slate PC, a tablet PC, an ultrabook, a wearable device (e.g., a smartwatch, a smart glass, and a head mounted display (HMD), an IoT device (e.g., including a refrigerator, a kimchi refrigerator, an air conditioner, a dryer, a coffee maker, a washing machine, an air purifier, a lighting, a boiler, or a CCTV), and a car.

That is, the firmware provision apparatus described in the present disclosure may include any device for controlling update of a micro controller unit (MCU), and the firmware provision apparatus may be installed in a device including the MCU or may be connected to the device including the MCU through wired/wireless communication to provide a firmware image for firmware installation to the MCU or to provide a delta file to update pre-installed firmware to the MCU.

Hereinafter, a firmware provision method of a firmware provision apparatus according to the present disclosure will be described in detail with reference to FIGS. 1 to 8.

FIG. 1 is a block diagram for explaining a firmware provision apparatus according to an embodiment of the present disclosure.

Figure 2:
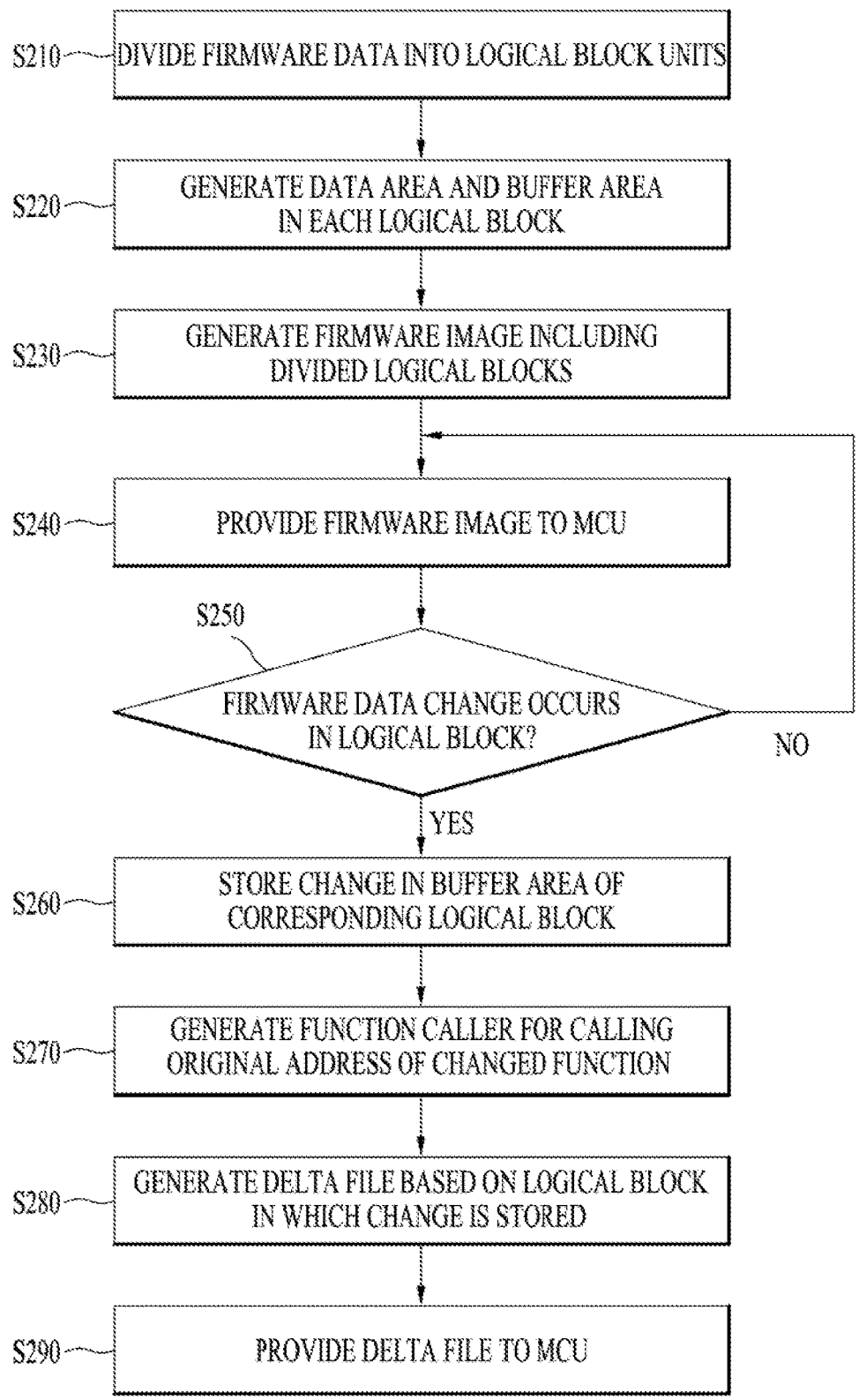
FIG. 2 is a flowchart for explaining a firmware provision apparatus according to an embodiment of the present disclosure.

FIG. 2 is a flowchart for explaining a firmware provision apparatus according to an embodiment of the present disclosure.

Referring to FIGS. 1 and 2, a firmware provision apparatus 100 according to the present disclosure may include a communication module 110, a memory 120, and a processor 130.

The communication module 110 may perform communication for installing firmware with an external device or may perform communication for updating firmware with an external device in which the firmware is installed.

The memory 120 may store data related to an operation of the firmware provision apparatus 100, and in particular, may store firmware data for generating a firmware image to be provided to an external device.

The processor 130 may control the overall operation of the firmware provision apparatus 100 according to the present disclosure, and in particular, may divide firmware data into separate logical blocks according to an embodiment, and in this case, the separate logical block include a buffer for managing changes of the firmware data, and the processor 130 may control the all logical blocks to minimize delta generation.

The processor 130 may generate a function pointer for calling an original address of a function in a data area of a separate logical block, and even if an address of the function is changed due to a change of firmware data, the processor 130 may perform control to call the original address through the function pointer.

The processor 130 may requests and back up an original firmware image before updating the firmware of the MCU of the external device, and may perform control to roll back the firmware of the MCU through the backed-up firmware image when firmware update of the MCU fails.

Referring to FIG. 2, the processor 130 may divide separate firmware data into logical block units in order to generate a firmware image to be installed in an external device [S210] and may generate a data area and a buffer area in each of the divided logical blocks [S220].

In this case, the data area may be an area for actually storing firmware data and may be configured in data units, and a minimum unit of the data may be an object file.

When a change (addition/deletion) occurs in firmware data stored in the data area in a corresponding logical block, the buffer area may be an area for storing the changes.

The processor 130 may store corresponding firmware data in a data area of each of the logical blocks and may then generate an image of firmware including the logical block [S230], and may transmit and provide the generated firmware image to the external device through the communication module 110 to install firmware in the MCU of the external device through the generated firmware image [S240].

As described above, when firmware data in the data area in at least one logical block among logical blocks in an image of the firmware to update the firmware installed in the MCU after the firmware is installed in the MCU of the external device [S250], the processor 130 may store change data corresponding to the change of the firmware data in a buffer area in the logical block [S260].

When an address of at least one function included the data area of at least one logical block among the logical blocks in the firmware image is changed due to change of the firmware image, the processor 130 may generate at least one function pointer for calling the original address of the function [S270]. In this case, the processor 130 may store the generated function pointer at the uppermost end of the data area of the corresponding logical block.

When the change data of the corresponding firmware data is stored in the buffer area of at least one logical block among the logical blocks of the firmware image, the processor 130 may generate a delta file for updating the firmware of the MCU based on the logical block in which the change data is stored [S280] and may transmit and provide the generated delta file to the MCU through the communication module 110 to update the firmware installed in the MCU based on the generated delta file [S290].

Hereinafter, with reference to FIGS. 3 to 7, a firmware provision and firmware update control procedure according to the present disclosure will be described in detail.

First, FIG. 3 is a diagram for explaining a procedure in which delta is generated in all logical blocks when a change occurs in firmware data according to the present disclosure.

FIG. 3(*a*) shows the state in which firmware data is divided into separate logical block units without a buffer area and corresponding firmware data is stored in a data area of each of the divided logical blocks.

In this case, FIG. 3(*b*) shows the case in which a change 31 occurs in a first logical block 30 among the logical block, and in this case, due to the change 31 in the first logical block 30, delta is generated in all the remaining logical blocks while existing firmware data is shifted.

That is, although the change 31 to which data of 3 bytes are added occurs in the first logical block 30, this may have problem in that delta is generated in all logical blocks.

FIG. 4 is a diagram for explaining a procedure of minimizing delta using a logical block structure including a buffer area when a change occurs in firmware data according to an embodiment of the present disclosure.

In order to overcome the problem of FIG. 3, FIG. 4(*a*) illustrates the case in which each of the logical blocks includes a data area 410 in which firmware data is stored and a buffer area 420 in which change data is stored.

FIG. 4(*b*) illustrates the case in which data 411 for update is added to the data area 410 of a second logical block among the logical blocks, and the processor 130 may store change data 421 generated due to addition of the data 411 in the buffer area 420 to prevent delta from being generated in all the remaining logical blocks as the remaining firmware data is shifted due to addition of the data 411 to the second logical block.

That is, according to the present disclosure, firmware data may be divided into separate logical blocks through data control and each of the logical blocks may have a buffer area, and thus because it may be possible to manage the change within a corresponding logical block, even if data for updating firmware is added or deleted, this may not affect other logical blocks other than a corresponding logical block.

Accordingly, because only the changed logical block is corrected, the size of a firmware update package may be reduced.

That is, in order to update an entire firmware image based on a difference algorithm, "original firmware image+delta file" needs to be loaded, and thus a lot of memory resources may be required.

Accordingly, firmware is actually updated to a logical block unit in consideration of an available memory, and in this case, offset in all logical blocks may be changed due to data added/deleted in a specific logical block to affect an entire firmware image, and there is a problem in that the size of the firmware update package is increased du e to this problem.

Thus, according to the present disclosure, in the method of minimizing the size of a delta size through data control, when each logical block has a buffer area and a change occurs in a specific logical block, the change may be stored in the corresponding buffer area, and thus other logical blocks may not be affected.

FIG. 5 is a diagram for explaining a procedure in which a function is not capable of being called properly when a function address is changed due to a change of firmware data according to the present disclosure.

FIG. 5(*a*) shows the case in which firmware data is divided into separate logical block units, at least one function[FUNC( )] 51 is included in a data area of a second logical block 50 among the divided logical blocks, and a call function[CALL( )] for calling the function 51 is included in a data area of a fourth logical block.

In this case, FIG. 5(*b*) shows the case in which a change 52 occurs in a first logical block among the logical blocks, and in this case, an original address of the function[FUNC( )] 51 is changed since the change 52 occurs in the first logical block, and thus a call function[CALL( )] for calling function[FUNC( )] 51 is also changed. To overcome this, all address values need to be changed to call the changed function[FUNC( )] 51 by the call function[CALL( )].

Figure 6:
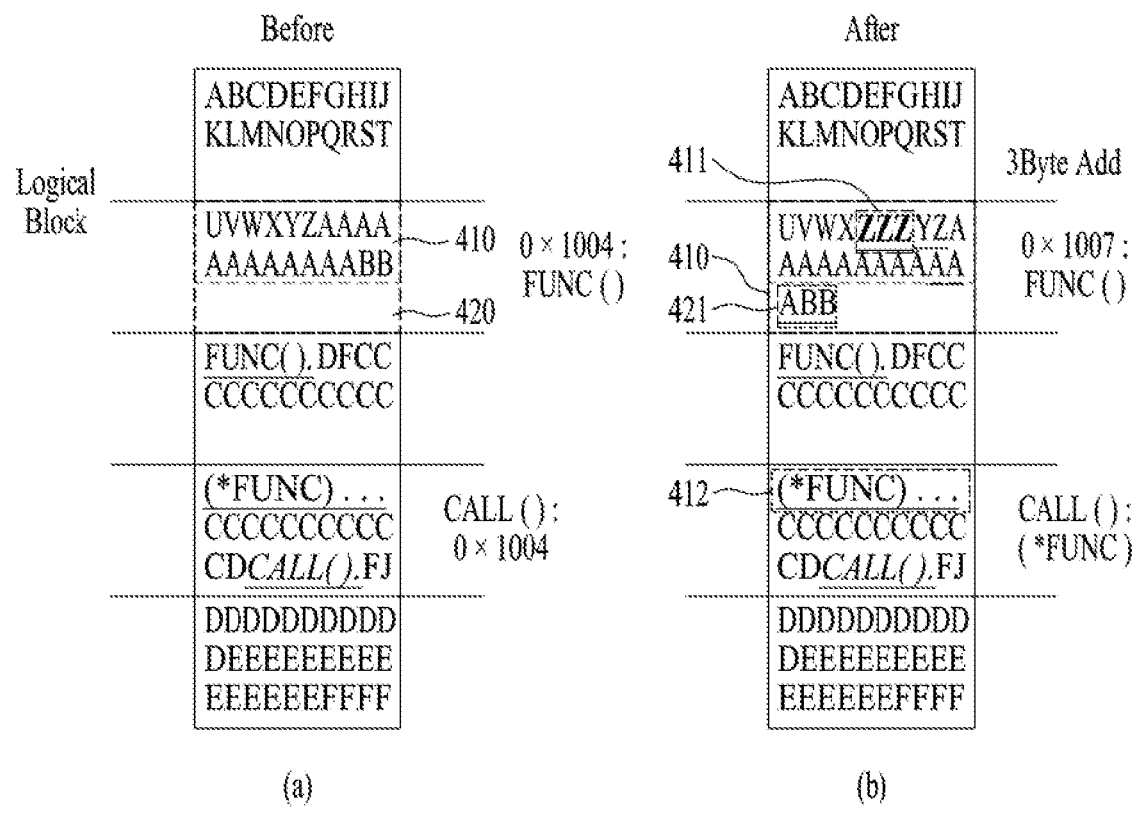

FIG. 6 is a diagram for explaining a procedure of calling a function with an original function using a function pointer when a change occurs in firmware data according to an embodiment of the present disclosure.

To overcome the problem of FIG. 5, FIG. 6(*a*) shows the case in which each logical block includes the data area 410 in which firmware data is stored and the buffer area 420 in which change data is stored.

FIG. 6(*b*) shows the case in which the data 411 for update is added to the data area 410 of the second logical block among the logical block, and the processor 130 stores the change data 421 generated due to addition of the data 411 in the buffer area 420 not to prevent delta from being generated in all the remaining logical blocks while the remaining firmware data is shifted due to addition of the data 411 in the second logical block.

When an address of at least one function [FUNC( )] included in a data area of the third block among the logical blocks is changed due to addition (due to the change) of the data 411, the processor 130 may generate at least one function pointer[(*FUNC) . . . ] 412 for calling the original address of the function[FUNC( )].

In this case, the processor 130 may generate the function pointer[(*FUNC) . . . ] 412 at the uppermost end of the data area of a fourth logical block including a call function [CALL( )] for calling the function[FUNC( )].

The function[FUNC( )] is implemented as a function pointer[(*FUNC) . . . ] 412 and access is achieved through the function pointer[(*FUNC) . . . ] 412, and thus a change of the call function[CALL( )] may not occur.

That is, offset of the remaining logical blocks may be changed by data added or removed in a specific logical block among logical blocks and may affect all logical blocks, and accordingly, an address of at least one function included in the all logical blocks may be changed.

Accordingly, all addresses for calling a corresponding function need to be changed due to an address of the changed function, but according to the present disclosure, a change related to an address may be removed using the function pointer 412.

Figure 7:
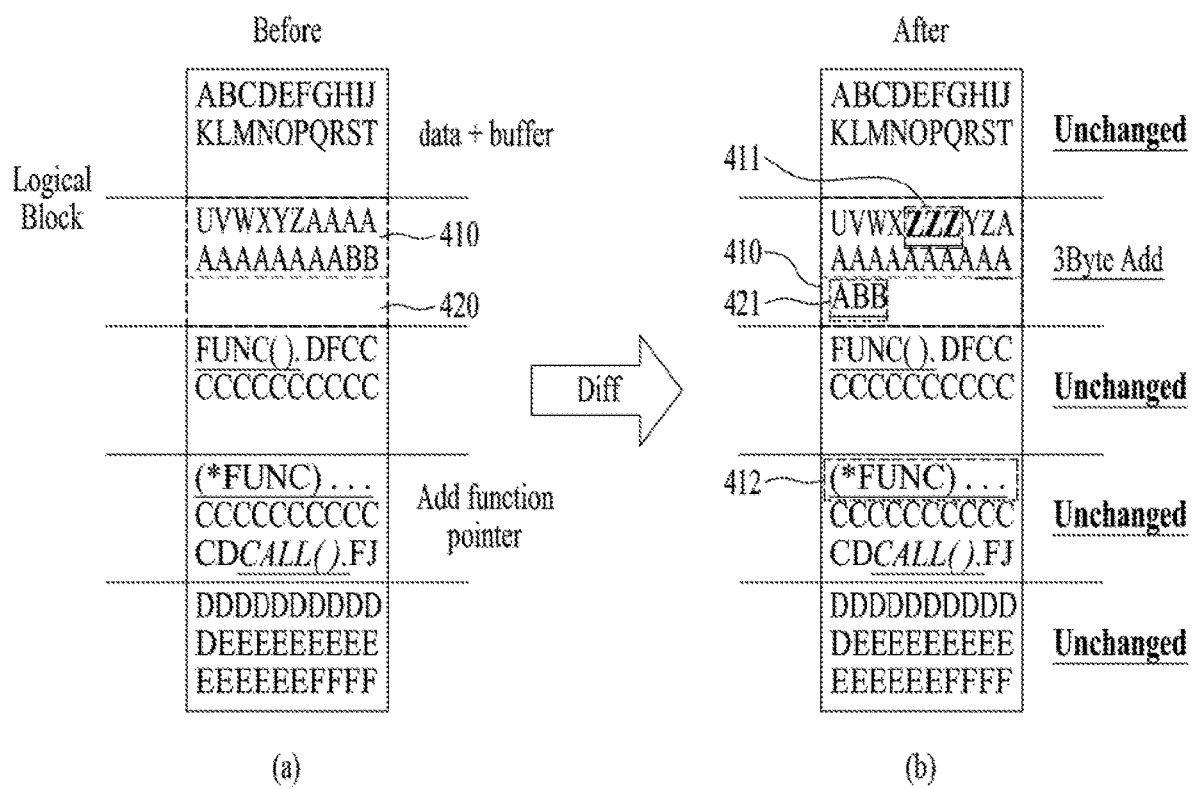
FIG. 7 is a diagram for explaining logical block structure including a buffer area and a function caller according to an embodiment of the present disclosure.

FIG. 7 is a diagram for explaining logical block structure including a buffer area and a function caller according to an embodiment of the present disclosure.

FIG. 7(*a*) shows a logical block structure including the buffer area and the function caller that are described above with reference to FIGS. 4 and 6.

FIG. 7(*b*) shows the case in which the data 411 for update is added to the data area 410 of the second logical block in the aforementioned logical block structure, and the change data 421 generated due to addition of the data 411 is stored in the buffer area 420 of the second logical block to prevent delta from being generated in all the remaining logical blocks while the remaining firmware data is shifted due to addition of the data 411 in the second logical block.

FIG. 7(*b*) shows the case in which at least one function pointer[(*FUNC) . . . ] 412 for calling an original address of the function[FUNC( )] is also generated at the uppermost end of a data area of a fourth logical block including a call function[CALL( )] for calling the function[FUNC( )] by at least one function pointer[(*FUNC) . . . ] 412 for calling an original address of the function[FUNC( )] when an address of a function[FUNC( )] included in a data area of the third logical block among the logical blocks is changed due to addition of the data 411 (due to the change).

As shown in FIG. 7(*b*), conventionally, a change occurs in all the remaining logical blocks except for the first logical block among all logical blocks due to addition of the data 411 in the data area 410 of the second logical block, and delta files of all the remaining logical blocks need to be generated and provided to the MCU of the external device, but according to the present disclosure, a delta file is generated only in the second logical block to which the data 411 is added using the buffer area and the function pointer, a delta file is not generated for the remaining logical blocks.

Thus, the size of the firmware update package may be reduced to reduce a server cost and an update time, and the firmware update package may be updated based on a logical block unit to minimize restriction due to low-capacity memory (eMMC) resources such as a memory of an IoT device.

Firmware update may be performed in the MCU of the external device through a delta file for firmware update provided from the firmware provision apparatus 100.

However, when an update failure occurs during the firmware update, only a portion of the original firmware image may be updated to mix an original image and update data, and in this case, because it is not possible to store an original firmware image in the low-capacity memory of the external device, there is no original firmware image, and it is not possible to return to the firmware image prior to the update by a rollback function, and accordingly, the MCU is not capable of operating.

That is, the MCU of an IoT device or a vehicle may be updated by transferring a package for firmware update to the MCU by the processor 130.

In this case, the MCU may not support recovery logical thereof due to a high limitation on resources. In this case, when an update failure occurs, the MCU may not be used any longer.

Figure 8:
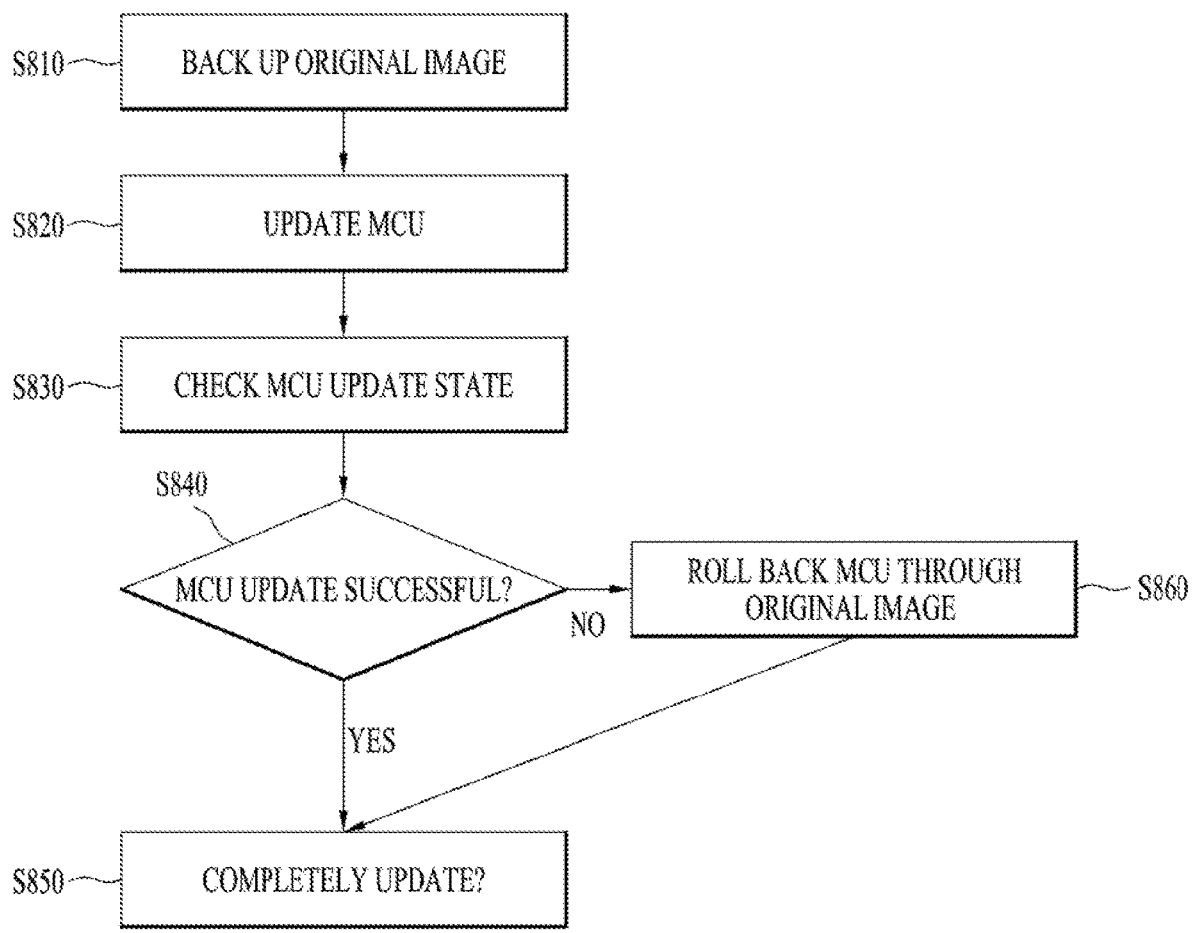
FIG. 8 is a flowchart for explaining a firmware image backup and MCU firmware update procedure of a firmware provision apparatus according to an embodiment of the present disclosure.

Thus, as shown in FIG. 8 below, when update of the MCU failures, the processor 130 may check an update state of the MCU, and when the processor 130 is capable of rolling back a firmware image installed in the MCU through a backed-up original firmware image, the reliability of update of the MCU may be ensured.

FIG. 8 is a flowchart for explaining a firmware image backup and MCU firmware update procedure of a firmware provision apparatus according to an embodiment of the present disclosure.

Referring to FIG. 8, the processor 130 may provide a delta file to the MCU to back up the original firmware image installed in the MCU before firmware update [S810]. In this case, an original backup location of the firmware image may be the memory 120 inside the firmware provision apparatus 100, an external memory connected to the firmware provision apparatus 100, or a cloud server for communication through the communication module 110.

After the original firmware image is backed up, the processor 130 may transmit the delta file generated by the procedure of FIGS. 1 to 7 to the MCU through the communication module 110 and may perform control to update the firmware of the MCU through the delta file [ S820].

In addition, the processor 130 may monitor whether an update failure occurs in the MCU while the MCU updates the firmware [S830].

As the monitoring result, when the MCU successfully updates the firmware [S840], the processor 130 may perform control complete the firmware update operation of the MCU [S850].

In contrast, as the monitoring result, when the firmware update of the MCU fails, the processor 130 may perform control to roll back an image in which firmware update of the MCU fails through the backed-up original firmware image [S860].

While the present disclosure has been particularly shown and described with reference to exemplary embodiments thereof, it is clearly understood that the same is by way of illustration and example only and is not to be taken as limiting the present disclosure. It will be understood by those skilled in the art that various changes in form and details may be made therein without departing from the subject matter and scope of the present disclosure.

The invention claimed is:

1. A firmware provision apparatus comprising:
   a memory configured to store firmware data of a specific device; and
   a processor configured to divide the firmware data into two or more logical blocks and to generate a firmware image including the divided logical blocks,
   wherein the logical blocks include a data area in which corresponding divided firmware data is stored, and a buffer area in which change data of the corresponding divided firmware data is stored.

2. The firmware provision apparatus of claim 1, further comprising:
   a communication module configured to communicate with a micro controller unit (MCU) of the device, wherein the processor performs control to install firmware in the MCU through the communication module based on the generated firmware image.

3. The firmware provision apparatus of claim 2, wherein, when change data of corresponding firmware data is stored in the buffer area of at least one logical block among the logical blocks, the processor generates a delta file for firmware update of the MCU based on the logical block in which the change data is stored, and performs control to update firmware installed in the MCU based on the generated delta file.

4. The firmware provision apparatus of claim 3, wherein, before the MCU is updated, the processor backs up an original firmware image installed in the MCU to the memory, and after the firmware image is completely backed up, the processor performs control to update the firmware installed in the MCU based on the delta file.

5. The firmware provision apparatus of claim 4, wherein the processor performs control to roll back the MCU through the backed-up firmware image when update of the MCU fails.

6. The firmware provision apparatus of claim 1, wherein, when an address of at least one function included in a data area of at least one logical block among the logical blocks is changed due to a change of the firmware data, the processor generates at least one function pointer for calling an original address of the function.

7. The firmware provision apparatus of claim 6, wherein the processor stores the generated function pointer at an uppermost of the data area of the corresponding logical block.

8. A method of providing firmware of a firmware provision apparatus, the method comprising:
    storing firmware data of a specific device;
    dividing the firmware data into two or more logical blocks; and
    generating a firmware image including the divided logical blocks, wherein the logical blocks include a data area in which corresponding divided firmware data is stored, and a buffer area in which change data of the corresponding divided firmware data is stored.

9. The method of claim 8, further comprising:
performing control to install firmware in a micro controller unit (MCU) of the device based on the generated firmware image.

10. The method of claim 9, further comprising:
when change data of corresponding firmware data is stored in the buffer area of at least one logical block among the logical blocks, generating a delta file for firmware update of the MCU based on the logical block in which the change data is stored; and
performing control to update firmware installed in the MCU based on the generated delta file.

11. The method of claim 10, further comprising
before the MCU is updated, backing up an original firmware image installed in the MCU; and
after the firmware image is completely backed up, performing control to update the firmware installed in the MCU based on the delta file.

12. The method of claim 11, further comprising
performing control to roll back the MCU through the backed-up firmware image when update of the MCU fails.

13. The method of claim 8, further comprising:
when an address of at least one function included in a data area of at least one logical block among the logical blocks is changed due to a change of the firmware data, generating at least one function pointer for calling an original address of the function.

14. The method of claim 13, further comprising:
storing the generated function pointer at an uppermost of the data area of the corresponding logical block.

* * * * *